May 29, 1945.  O. W. WINTER ET AL  2,377,289
ADJUSTABLE SUPPORT FOR WELDING MACHINES
Original Filed Dec. 3, 1941   3 Sheets-Sheet 1

INVENTORS
OTTO W. WINTER &
CHARLES W. MIDDLESTEAD
Bean, Brooks, Buckley & Bean, ATTORNEYS

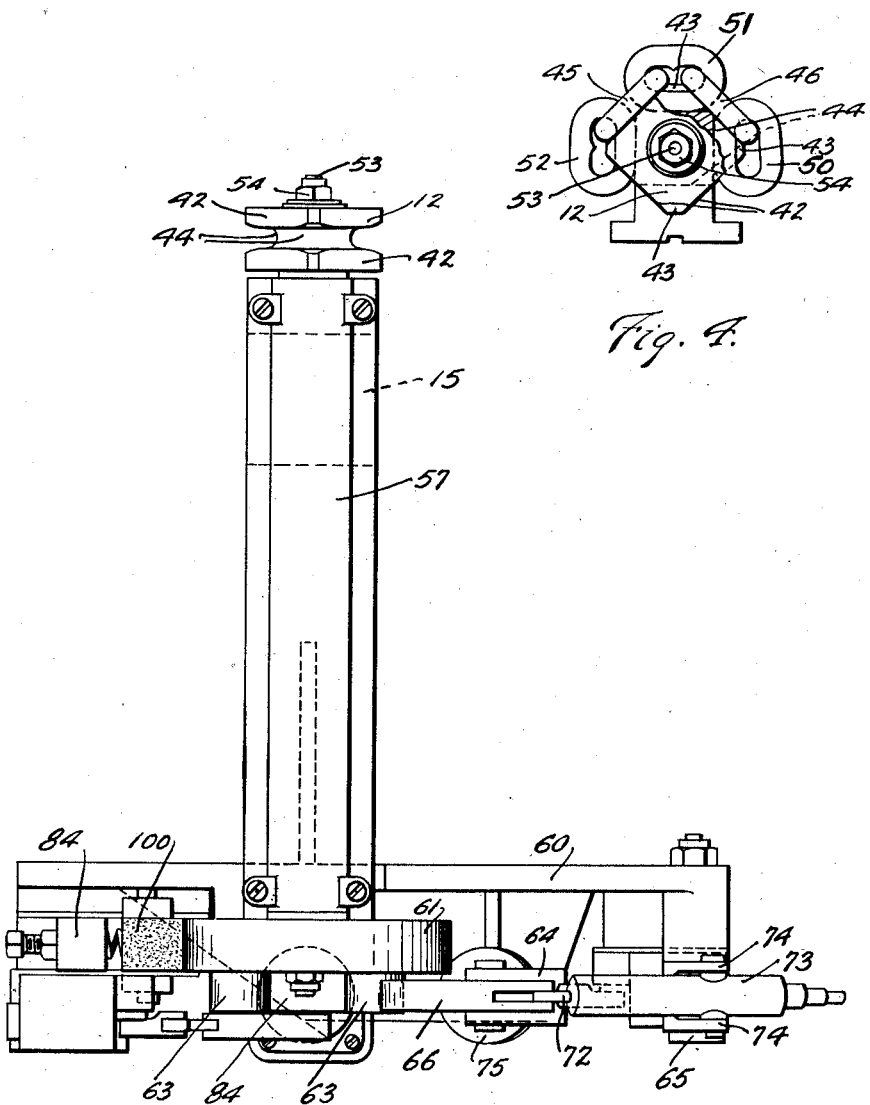

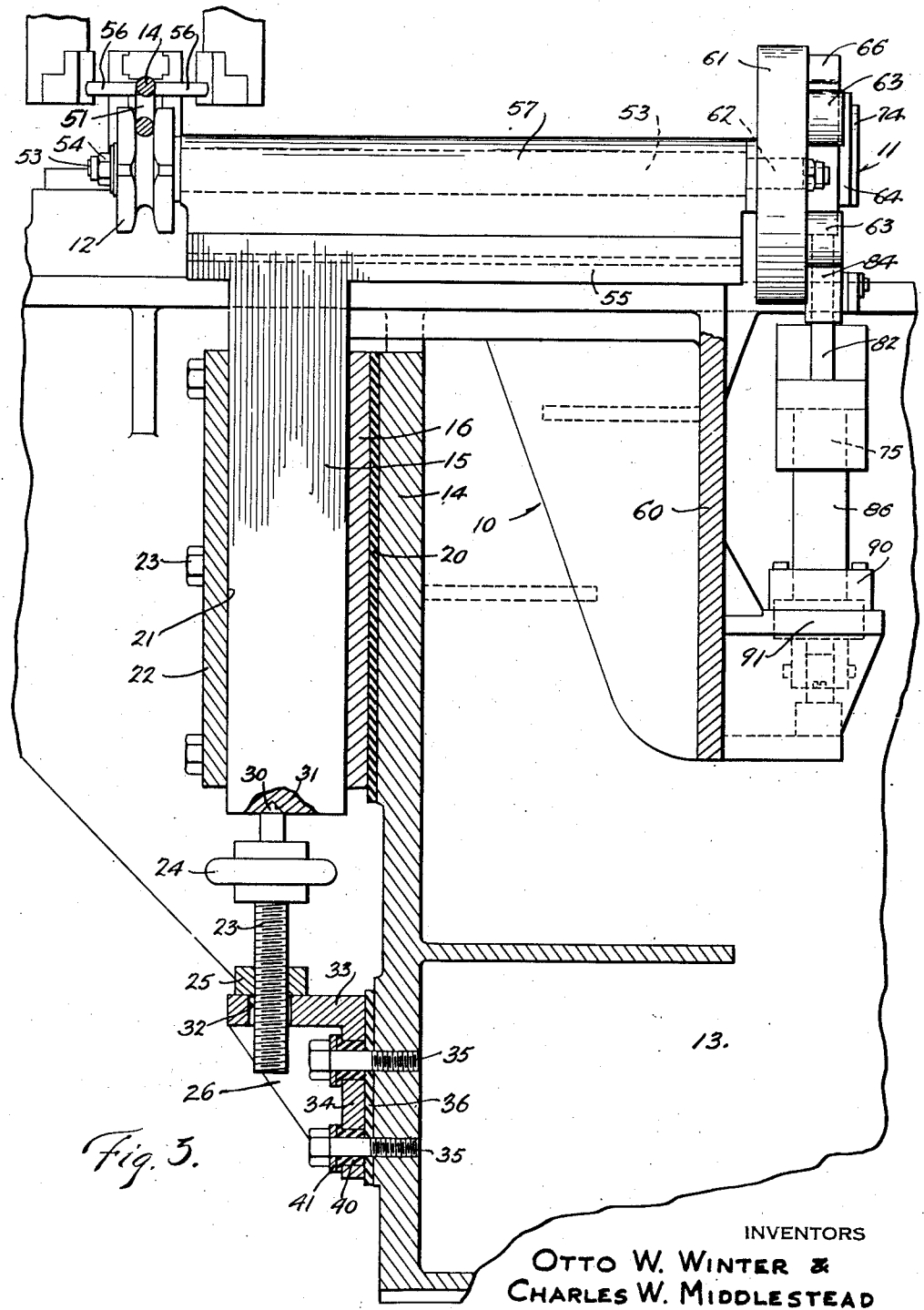

Patented May 29, 1945

2,377,289

UNITED STATES PATENT OFFICE 2,377,289

ADJUSTABLE SUPPORT FOR WELDING MACHINES

Otto W. Winter, Birmingham, Mich., and Charles W. Middlestead, Warren, Ohio, assignors to Columbus McKinnon Chain Corporation, Tonawanda, N. Y., a corporation of New York Original application December 3, 1941, Serial No. 421,478. Divided and this application February 10, 1944, Serial No. 521,828

7 Claims. (Cl. 219—5)

Our invention relates in general to adjustable supports for welding machines, and more particularly to a support for the index means of such machines, and is a division of our application Serial No. 421,478, filed by us on December 3, 1941, now Patent No. 2,344,435, dated March 14, 1944.

It is well known to those skilled in the art that in chain welding machines of present day design, the feed wheel is fixed in relation to the welding electrodes of the machine so that when a different size link is to be welded it is necessary to change the wheel in order that the proper relation between the link and the electrode may be had, thus not only requiring a different size feed wheel for each size link, but causing delays in making the necessary changes.

The principal object of our invention has been, therefore, to provide means for adjustably supporting the feed wheel of a chain welding machine, whereby the same feed wheel may be used to support a number of different size links while being welded.

Another object has been to provide a bracket for the support of the index means of a welding machine which shall be independent of and adjustable in relation to the other mechanisms of the machines.

Another object has been to provide an adjustable bracket for the support of the index means and feed wheel, whereby the position of the feed wheel may be accurately adjusted with relation to the electrodes of the machine.

The above objects and advantages have been accomplished by the device shown in the accompanying drawings, of which:

Fig. 2 is a plan view thereof.

Fig. 3 is a side sectional elevation of our device taken on line III—III of Fig. 1 showing the device attached to the frame of the welding frame with which it is used; and, Fig. 4 is a fragmentary front view showing the feed wheel.

Figure 1:
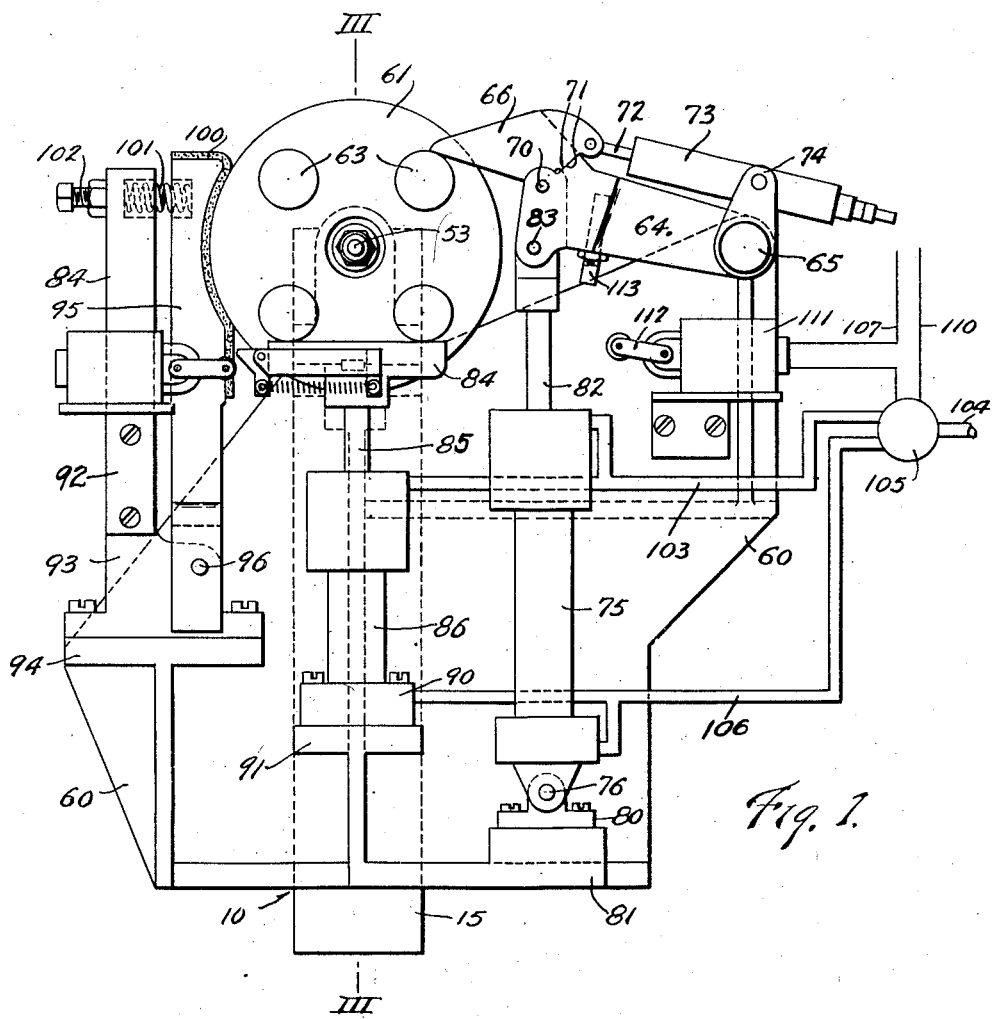
Fig. 1 is a rear elevation of our invention.

Our invention comprises in general a bracket 10 for supporting the index means 11 and the feed wheel 12 of a chain welding machine 13. One of the walls 14 of the machine is shown in fragmentary manner in Fig. 3 and our bracket is mounted upon the outer surface of this wall. The bracket is provided with a vertically arranged slide 15 preferably polygonal in cross section and mounted in a slide housing 16. This housing is suitably attached to the wall 14 and has an insulator 20 disposed between it and the wall, so as to insulate the housing from the machine. The housing is provided with a slideway 21 for the reception of the slide 15 and it is closed by means of a cover plate 22, held in place by means of bolts 23.

So as to adjust the bracket 10 vertically in order to adjust the link supported by the feed wheel, an adjusting screw 23 is provided, having a hand wheel 24 attached thereto. This screw is screw-threaded into an adjusting screw plate 25 which is carried by a screw bracket 26, suitably secured to the frame 14 of the welding machine directly beneath the slide 15. The screw may be formed at its upper end with a conical point 30 which fits into a suitably tapered recess 31 formed in the lower end of the slide 15. The screw passes through an aperture 32 formed in the horizontal leg 33 of the screw bracket, and the vertical leg 34 of this bracket is held in place by means of screws 35. The screw bracket is insulated from the wall 14 of the housing by means of an insulator 36, the screws 35 being also insulated by means of sleeves 40 and washers 41 of suitable insulating material. The bracket is thus supported by means of the screw 23, whereby the feed wheel 12 of the welding machine may be quickly adjusted to handle links of a number of various sizes.

The feed wheel 12 of the welding machine is, as is customary, polygonal or four-sided in shape having flat exterior surfaces 42 for the support of the alternate links 45 and 46 on their sides. In each of the corners 43 of the wheel a groove 44 is formed for the reception of the alternate links 50, 51 and 52. The chain link 51 is being held by the wheel 12 in welding position; the link 50 is ready to be fed to the welding position upon operation of the feed wheel; and the link 52 has already been welded. As is customary in chain welding machines, each alternate link is successively welded each time the chain is run through the machine, and the links 50, 51 and 52 which are the links acted upon in the welding machine shown are connected together by means of links 45 and 46, supported by the surfaces 42.

The feed wheel 12 is mounted upon a shaft 53 and is preferably held thereon by means of a nut 54. This wheel may be used for a number of differently sized links within a limited range owing to the adjustable feature of our invention, but when required, the wheel may be easily replaced by a different one so as to adapt the machine to which the invention is applied to the welding of links within a broad scope of different sizes while permitting accurate adjustment of the links with relation to the electrodes of the welding machine.

The shaft 53 is suitably mounted within a bearing standard 57 which is secured to the horizontal platform 55 of the bracket 10. In Fig. 3, we have shown the electrodes 56 of the welding machine in contact with the sides of the link 51.

The index bracket 10 is provided at its rear side with an integral vertical plate 60 which is arranged at right angles to the platform 55 and which carries the operating parts of the index means 11.

Our index means comprises an index drum 61 which is non-rotatably carried by the inner end 62 of the index shaft 53. The drum is provided on its outer surface with four index rollers 63 which project from the face of the drum and which are equidistantly spaced thus providing for a 90° rotation of the shaft and feed wheel each time one of the rollers is actuated.

Carried by the plate 60 of the index bracket is an index lever 64. This lever is pivotally attached at its outer end to the plate 60 by means of a pivot pin 65. An index trip dog 66 is provided at the inner end of the index lever and this dog is pivotally attached to the lever by means of a pivot pin 70. The clockwise movement of the dog upon its pivot pin is prevented by coacting surfaces 71 formed on the dog and on the lever, whereby when the lever is actuated in counter-clockwise direction, the shaft 53 will be partially rotated by engagement of the dog with one of the rollers 63. Due to the pivotal connection of the dog 66 with the lever, the dog will move idly past the adjacent roller 63 when the lever is moved upwardly to its initial position. The dog is held in its normal position by means of a spring pressed rod 72 slidably carried by a spring housing 73. This spring housing is suitably mounted for oscillation between the upstanding arms 74.

The index lever 64 of our machine is preferably operated by hydraulic means, an index cylinder 75 being provided for this purpose. This cylinder is pivotally supported by a pin 76 carried by a bracket 80. The bracket 80 is attached to a supporting plate 81, carried by the plate 60 of the machine. By pivotally mounting the cylinder 75, it may be free to oscillate during operation to compensate for the angular movement of the index lever 64. The piston rod 82 of the index cylinder is extended upwardly and is attached to the lever 64 by means of a pivot pin 83.

Our invention includes means for locking the index drum in the position to which it has been operated by means of the index lever and trip dog. These means are also carried by the bracket 10 and comprise a lock bar 84 which is attached to and carried by the piston rod 85 of the lock cylinder 86. This cylinder is provided with a base 90 which is carried by and secured to a supporting plate 91 extending outwardly from and secured to the plate 60 of the bracket. The lock bar 84 is preferably of sufficient length to extend across and to engage the two lower rollers shown in Fig. 1. So as to retard any tendency of the index drum to spin or to be moved by inertia beyond a predetermined amount, we provide a brake 92 which comprises a brake pedestal 93, rigidly secured to a supporting plate 94 carried by the plate 60 of the bracket. The brake is provided with a brake lever 95 which is pivotally attached to the pedestal 93 by means of a pin 96. The brake lever is arranged adjacent the index drum 61 and is provided on the face which contacts the periphery of the drum with a brake band or lining 100. A helical spring 101 is arranged between the back surface of the brake lever 95 and the front face of the pedestal 93 which serves to keep the brake lever yieldably pressed in contact with the drum. An adjusting screw 102, carried by the pedestal, provides means for adjusting the tension of the spring 101.

When operating the feed wheel 12 through the medium of the shaft 53 and index disc 61, it is preferable to operate the index cylinder 74 and the lock cylinder 86 in unison. To accomplish this a pipe 103 conducts fluid from a suitable supply pipe 104 to the upper ends of both of these cylinders whereby when the fluid controlled by the valve 105 is permitted to pass through the pipe 103 the piston rods of each of these cylinders will be moved downwardly, thereby releasing the lock bar 84 from the contact with the engaged rollers 63 and causing the disc 61 to be rotated through substantially 90°. The piston rods are likewise moved upwardly in unison by means of fluid under pressure which is conducted to the lower ends of the cylinders by means of the pipe 106. This fluid is also controlled by the valve 105 which is a solenoid valve of standard manufacture and which is operated by current coming from the leads 107 and 110 through a suitable control switch 111. The control switch has an arm 112 which is engaged by a stud 113 adjustably carried by the index lever 64. The switch 111 is a normally closed switch so that when current is supplied by means of leads 107 and 110, the valve 105 will be actuated to conduct fluid to the upper ends of the cylinders, as just above described. When, however, the lever 64 is moved downwardly the predetermined distance, the stud 113 will contact the arm 112 of the switch and interrupt the flow of current, thereby allowing the valve to return to normal position where fluid will be directed to the lower ends of the cylinders, causing the parts to be returned to and held in the normal positions shown in Fig. 1.

Having thus described our invention, what we claim is:

1. A chain welding machine, comprising opposed welding electrodes, a chain-supporting feed wheel rotatably mounted for progressively presenting links to said electrodes, a shaft for mounting said wheel, a bearing for said shaft, means for adjusting said bearing toward and from said electrodes to accommodate various size links.

2. A chain welding machine, comprising opposed welding electrodes, a chain-supporting feed wheel rotatably mounted for progressively presenting links to said electrodes, a shaft carrying said feed wheel, a bracket for said shaft, pawl and ratchet means supported by said bracket for intermittently rotating said shaft, means slidably mounting said bracket, and means for adjusting the position of said bracket, whereby to position said feed wheel in respect to said electrodes to accommodate various size links.

3. A chain welding machine, comprising opposed welding electrodes, a chain-supporting feed wheel rotatably mounted for progressively presenting links to said electrodes, a shaft carrying said feed wheel, a bracket for said shaft, pawl and ratchet means supported by said bracket for intermittently rotating said shaft, position-determining means carried by said bracket and engageable with two abutments of the ratchet for arresting the ratchet, means slidably mounting said bracket, and means for adjusting the position of said bracket, whereby to position said wheel in respect to said electrodes to accommodate various size links.

4. A welding machine, comprising a frame, opposed welding electrodes carried by said frame, a chain-supporting feed wheel rotatably mounted for progressively presenting links to said electrodes, a shaft carrying said wheel, a bearing for said shaft, a bracket for said bearing, said bracket having a substantially horizontal platform for supporting said bearing and a slide arranged at substantially right angles to said platform, a slide housing carried by said frame for slidably supporting said bracket, and means carried by said frame and said slide for adjusting the latter.

5. A welding machine, comprising a frame, opposed welding electrodes carried by said frame, a chain-supporting feed wheel rotatably mounted for progressively presenting links to said electrodes, a shaft carrying said wheel, a bearing for said shaft, a bracket for said bearing, said bracket having a substantially horizontal platform for supporting said bearing and a slide arranged at substantially right angles to said platform, a slide housing carried by said frame for slidably supporting said bracket, a screw bracket carried by said frame and arranged below said slide, and an adjusting screw carried by said screw bracket and engageable with said slide for vertically adjusting the same with respect to said electrodes.

6. A welding machine, comprising a frame, opposed welding electrodes carried by said frame, a chain-supporting feed wheel rotatably mounted for progressively presenting links to said electrodes, a shaft carrying said wheel, a bearing for said shaft, a bracket for said bearing, said bracket having a substantially horizontal platform for supporting said bearing and a slide arranged at substantially right angles to said platform, a slide housing carried by said frame for slidably supporting said bracket, a screw bracket carried by said frame and arranged below said slide and passing through an enlarged aperture in the screw bracket, and a screw plate mounted upon said screw and supported by said screw bracket, said screw having bearing engagement with said slide for vertically adjusting the same.

7. A welding machine, comprising a frame, opposed welding electrodes carried by said frame, a chain-supporting feed wheel rotatably mounted for progressively presenting links to said electrodes, a shaft carrying said wheel, a bearing for said shaft, a bracket for said bearing, said bracket having a substantially horizontal platform for supporting said bearing and a slide arranged at substantially right angles to said platform, a slide housing carried by said frame for slidably supporting said bracket, a screw bracket carried by said frame and arranged below said slide, electrical insulation between said frame and said slide housing and screw bracket, and an adjusting screw carried by said screw bracket and engageable with said slide for vertically adjusting the same with respect to said electrodes.

OTTO W. WINTER.
CHARLES W. MIDDLESTEAD.